March 4, 1941.　　　　V. S. SHAW　　　　2,233,558

EXTRUSION CHAMBER FOR PLASTIC EXTRUSION PRESSES

Filed July 10, 1936

INVENTOR
VICTOR S. SHAW
BY
Toulmin & Toulmin
ATTORNEYS

Patented Mar. 4, 1941

2,233,558

UNITED STATES PATENT OFFICE 2,233,558

EXTRUSION CHAMBER FOR PLASTIC EXTRUSION PRESSES

Victor S. Shaw, Cardington, Ohio, assignor to The Hydraulic Press Corporation, Inc., Wilmington, Del., a corporation of Delaware Application July 10, 1936, Serial No. 89,949

3 Claims. (Cl. 18—30)

This invention relates to devices for feeding plastic materials, and in particular, for extrusion feeding apparatus for supplying molding materials to plastic extrusion presses.

One object of this invention is to provide a combination heating and extrusion chamber for plastic materials, which is provided with internal and external heating arrangements, preferably by electrical heating coils, or optionally by circulating hot fluid, the plastic material being caused to move in tubular form so as to be heated more thoroughly and more evenly than is possible with a mere external heating arrangement alone.

Another object is to provide a heating and extrusion chamber for plastic materials, wherein the chamber is provided with a nozzle having an inwardly extending heating member attached thereto so as to cause the molding material to be heated internally as well as externally.

Another object is to provide a heating and extrusion chamber having an arrangement for cooling the throat of the inlet hopper so as to prevent the clogging of the throat by the material becoming plastic before it enters the extrusion chamber.

Another object is to provide a heating and extrusion chamber for plastic materials, wherein the chamber is provided with a plunger having floating or self-aligning connection to a moving member so that the moving member is caused to move the plunger, yet permit the plunger to align itself within its chamber.

Another object is to provide a heating and extrusion chamber for plastic materials, having internal and external heating units, the temperature whereof is regulated by a thermostat having its bulb inserted in a cavity in the heating chamber.

Figure 1:
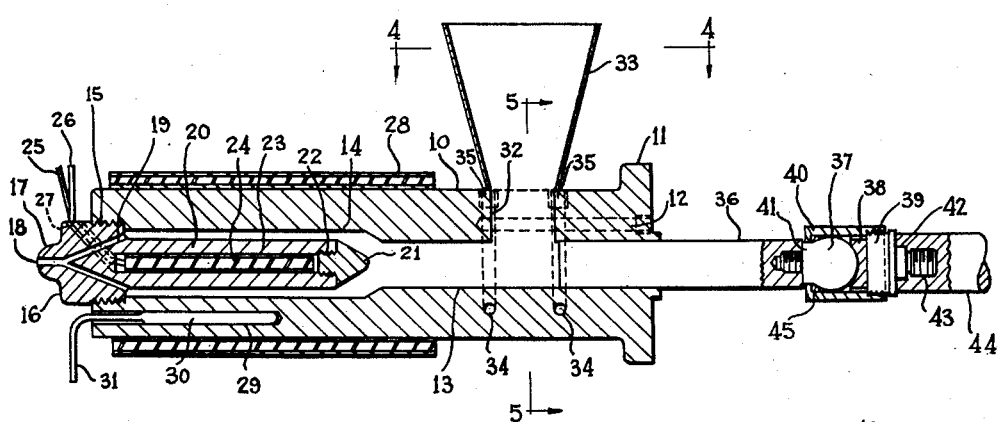
Figure 1 is a central vertical section through the combination heating and extrusion chamber of this invention.

The present invention consists of an injection device adapted for feeding or injecting plastic materials to machinery employing such materials, such as plastic extrusion presses. In such machinery the problem has arisen of maintaining the molding materials in a sufficiently plastic condition while they are being injected into the dies which mold the plastic material into the desired articles. It has been found that if the extrusion or injection chamber is heated on its external walls alone, this heating does not penetrate the mass of molding material very effectively toward the center thereof. The problem, therefore, arises of evenly heating the molding material so as to render it plastic before it is injected into the molding dies.

The present invention solves this problem by providing an internal heating member having heating means incorporated therewith, and so arranged as to cause the molding material to occupy a tubular chamber, with a heating arrangement both outside and inside this chamber. By thus causing the molding material to assume a tubular form it has been found that the material becomes more uniform in its plasticity and is heated more rapidly, and consequently is more satisfactory in molding. Hitherto it has been found that if the molding materials are maintained under heat for too long a period, the heat tends to dissipate the plasticizing ingredient, hence, it is desirable to bring the material to the desired temperature as quickly as possible, and to hold it at this temperature for the minimum period of time. The present invention accomplishes this purpose, and enables the molding material to be brought rapidly into a plastic state and to be quickly injected into the molding dies.

Hitherto it has furthermore been found that the plunger used in connection with the extrusion chamber for forcing the plastic materials out of the chamber required a very small clearance, otherwise, the molding material will get between the plunger and the chamber and crowd the plunger over to one side. This results in the scoring of the plunger or chamber bore. It is mechanically impractical, however, to maintain a rigidly mounted plunger in alignment with the chamber bore, where the clearance therebetween is held down to a sufficiently small amount to prevent the material from getting between the two parts. The considerable length of the plunger results in the magnifying of a misalignment so that an error of a few tenths of a thousandth of an inch at the point of mounting will result in a misalignment at the outer end greater than the clearance between the plunger and the bore. The present invention likewise solves this problem by providing a self-aligning or floating mounting for the plunger so that the plunger is permitted to be guided by the bore of the chamber while it is being moved by the moving member. The latter may be any suitable means, such as a hydraulic plunger.

In the past it has also been found that the plastic material entering the heating and extrusion chamber is liable to be prematurely heated and become plastic before it reaches the chamber, and before it is exposed to the action of the plunger. Under these conditions the material tends to clog the throat of the opening into the extrusion chamber. The present invention eliminates this difficulty by providing cooling means around the throat of the inlet opening of the extrusion chamber so that the molding material is prevented from becoming plastic prematurely.

The plastic extrusion chamber of the present invention may be used with any type of machinery utilizing plastic materials, and is especially adapted for use with plastic extrusion presses. The invention is particularly adaptable for use in the plastic extrusion press disclosed and claimed in my copending application, Ser. No. 79,954, filed May 15, 1936 (now U. S. Patent 2,107,190). The employment of the plastic extrusion chamber of the present invention, however, enables the elimination of supplemental charging and feeding devices for feeding the plastic materials to the extrusion chamber. It will be understood, however, that the plastic extrusion chamber of the present invention may be supplied with measuring devices for measuring out charges of molding material containing predetermined quantities, in a manner disclosed and claimed in my copending application, Ser. No. 87,270, filed June 25, 1936. For purposes of convenience and clearness of showing, however, the present invention is described in connection with a plain hopper rather than with mechanism for delivering measured charges.

Referring to the drawing in detail, Figure 1 shows the combined heating and extrusion chamber of this invention as consisting of a casing 10 having an attachment flange 11 for attachment to the press or machine in connection with which the invention is used. The casing 10 is provided with a cylindrical bore 13, having an enlargement 14 terminating in a threaded opening 15. Threaded into the opening 15 is a nozzle 16 having a tip 17 adapted to enter a corresponding depression in the die, or other member which the nozzle 16 is intended to serve. The nozzle 16 is provided with a discharge bore 18 having inwardly diverging branch passageways 19 communicating with the bore enlargement 14.

Extending inwardly from the nozzle 16 is an internal member 20 having a conical tip 21 for deflecting the plastic materials and forcing them into the tubular space between the member 20 and the bore enlargement 14 in the casing 10. The tip 21 is threaded into one end 22 of a bore 23, which contains a heating device 24 for heating the member 20. This heating device may consist of a space for the circulation of a hot liquid, such as hot oil, or, as in the drawing, an electrical heating unit having the wires 25 and 26 passing through the bore 27 in the nozzle 16.

The casing 10 is also provided with a heating arrangement 28, this likewise being shown as an electrical heating unit surrounding the casing 10. It will be understood, however, that a similar oil heating arrangement could be employed merely by causing the hot oil to circulate through chambers within the walls of the casing 10. The casing 10 is also provided with a longitudinal bore 29 adapted to receive the bulb 30 of a thermostat, the connection being made thereto by means of wires within the conduit 31. In this manner the temperature of the casing 10 is very accurately indicated, and can be correspondingly regulated.

The bore 13 of the casing 10 is provided with a transverse passageway 32 for the intake of molding materials, forming the throat of a hopper 33, adapted to receive the molding materials. Surrounding the passageway 32 and the adjacent portion of the bore 13 are passageways 34 interconnected by the longitudinal passageway 12. By the circulation of a cooling agent through these passageways the molding material is prevented from becoming plastic in the passageway 32, and is therefore prevented from prematurely clogging this passageway before it reaches the bores 13 and 14. The cooling liquid, or other cooling agent, is supplied to the passageways 34 by way of the inlet and outlet ports 34a and 34b, respectively, to which suitable pipe connections may be attached. The ends of the passageways 12 and 34 are elsewhere closed by the plugs 35 threaded therein.

Mounted for reciprocation within the bore 13 is an injection plunger 36, having attached thereto a ball member 37. The end of this ball member is seated in a correspondingly curved socket member 38, mounted upon a threaded base 39 upon which is threaded the sleeve 40, with its outer rim engaging the reduced diameter portion 41 of the ball member 37 so as to force the latter into the curved socket member 38. The base 39 is provided with a threaded shank 42, threaded into an internally threaded bore 43 in the end of a movable member 44. The movable member 44 preferably consists of the piston rod of a hydraulic plunger (not shown), but similar to that shown in my copending application, Ser. No. 79,954, filed May 15, 1936, previously referred to.

In the operation of the combination heating and extrusion chamber of this invention, assuming the chamber to be mounted to move into engagement with the die member which it is intended to serve, the chamber is brought into engagement with the die member by this means. Pieces of molding material are then placed in the hopper 33, whence they fall through the passageway 32 into the bore 13. The movable member 44 is then operated to force the injection plunger 36 to the left, causing the molding material to be pushed into the interior of the casing 10. Meanwhile, the heating of this casing by the external heating unit 28 and the internal heating unit 24 causes the molding material to become plastic, whereupon it flows past the tip 21 into the space between the casing 10 and the internal member 20. Thus the molding material is quickly transformed from a rigid to a plastic condition. By the further movement of the plunger 36 the now plastic molding material is forced outwardly through the branch passageways 19, thence through the discharge opening 18, into the die.

Figure 2:
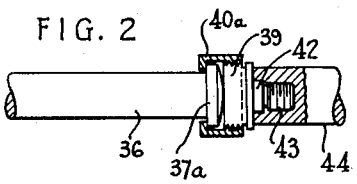
Figure 2 is a side elevation, partly in section, of a modified construction for the plunger connection shown in Figure 1.
Figure 3:
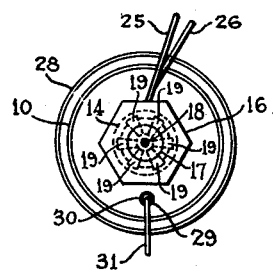
Figure 3 is a left-hand end elevation of Figure 1.
Figure 4:
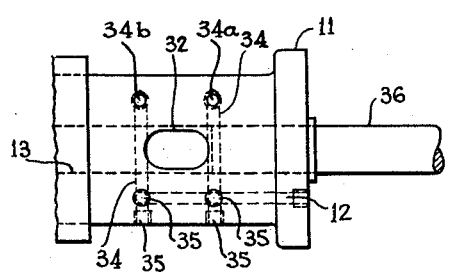
Figure 4 is a top plan view, taken along the line 4—4, of the central portion of Figure 1, with the hopper removed to show the construction of the cooling channels.
Figure 5:
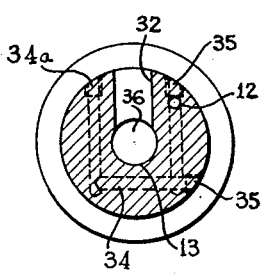
Figure 5 is a vertical cross section along the line 5—5 in Figure 1.

The modified construction of Figure 2 for the flexible connection between the plunger 36 and the piston rod 44 is similar to that of Figure 1, with the exception of the fact that the plunger 36 is provided with an enlarged head 37a having a spherical curved surface engaging a relatively flat surface on the threaded base 39. The sleeve 40a is threaded onto the threaded base 39 and retains the head 37a in engagement therewith. This construction gives a flexible connection between the plunger 36 and the piston rod 44, enabling a sidewise or angular shifting to take place between the parts.

It will be understood that I desire to comprehend within this invention such modifications as come within the scope of the claims and the invention.

Having thus fully described my invention, what I claim as new and desire to secure by Letters Patent, is:

1. A heating and extrusion chamber comprising a casing having a cylindrical bore, heating means associated with said casing, a nozzle mounted in said casing bore and having an outlet channel, a solid cylindrical internal material deflector mounted on said nozzle and positioned to extend rearwardly from said nozzle partially into said bore, said portion of the bore surrounding said deflector being of larger cross-section than the portion of the bore rearward of said deflector, a plurality of material-conducting passageways within said nozzle diverging from the outlet channel thereof into the annular space formed between said deflector and said cylindrical bore, means for supplying material to said portion of the bore rearward of the deflector, said heating means surrounding said casing and extending over both portions of the bore whereby said material is heated before contacting said deflector, heating means within said deflector, and a reciprocable extrusion plunger in said portion of the bore rearward of the deflector.

2. A heating and extrusion chamber comprising a casing having a cylindrical bore, an electrical heating unit disposed adjacent said bore, a nozzle with an axial outlet channel associated with said casing for delivering the plastic material therefrom, an internal solid deflector mounted on said nozzle and extending rearwardly therefrom partially into said bore, said deflector being cylindrical over the major portion of its length and having its rearward portion converging to a point, said portion of the bore surrounding said deflector being of larger cross-section than the portion of the bore rearward of said bore, axially directed material passages in said nozzle interconnecting said nozzle channel and the annular space formed between said deflector and said cylindrical bore, means for supplying material to said portion of the bore rearward of the deflector, said casing heating means surrounding said casing and extending over both portions of the bore, an electrical heating unit within said deflector and a reciprocating extrusion plunger in said portion of the bore rearward of the deflector.

3. A heating and extrusion chamber comprising a casing having a cylindrical bore, an electrical heating unit disposed adjacent said bore, a nozzle with an axial outlet channel associated with said casing for delivering the plastic material therefrom, an internal solid deflector mounted on said nozzle and extending rearwardly therefrom partially into said bore, said deflector being cylindrical over the major portion of its length and having its rearward portion converging to a point, said portion of the bore surrounding said deflector being of larger cross-section than the portion of the bore rearward of said bore, axially directed material passages in said nozzle interconnecting said nozzle channel and the annular space formed between said deflector and said cylindrical bore, means for supplying material to said portion of the bore rearward of the deflector, said casing heating means surrounding said casing and extending over both portions of the bore, an electrical heating unit within said deflector, a reciprocating extrusion plunger in said portion of the bore rearward of the deflector, a container for unmelted molding material, an inlet conduit from said container communicating with the rear portion of said cylindrical bore, and means for cooling said inlet conduit and for thereby preventing the clogging of said conduit by the molding material becoming prematurely plastic before arriving at said bore.

VICTOR S. SHAW.